(12) United States Patent
Mueller et al.

(10) Patent No.: US 10,564,652 B2
(45) Date of Patent: Feb. 18, 2020

(54) VALVE WITH FLOW CONTROL AND PRESSURE LIMITATION FUNCTION

(71) Applicant: Robert Bosch GmbH, Stuttgart (DE)

(72) Inventors: Thomas Mueller, Steinfeld (DE); Konrad Schneider, Fellen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/350,723

(22) Filed: Nov. 14, 2016

(65) Prior Publication Data

US 2017/0139428 A1  May 18, 2017

(30) Foreign Application Priority Data

Nov. 18, 2015  (DE) .................. 10 2015 222 745

(51) Int. Cl.
| | |
|---|---|
| *G05D 7/01* | (2006.01) |
| *F16K 11/16* | (2006.01) |
| *F16K 17/04* | (2006.01) |
| *F16K 31/06* | (2006.01) |
| *G05D 7/00* | (2006.01) |

(52) U.S. Cl.
CPC ......... *G05D 7/014* (2013.01); *F16K 17/0466* (2013.01); *F16K 31/0686* (2013.01); *G05D 7/005* (2013.01)

(58) Field of Classification Search
CPC ............ G05D 7/014; F15B 2013/0412; F15B 11/161; F15B 11/163
USPC ................... 137/504, 601.18, 601.19
See application file for complete search history.

(56) References Cited

U.S. PATENT DOCUMENTS

2012/0144940 A1*  6/2012  Moehlmann ........ F16H 61/0021
74/331

FOREIGN PATENT DOCUMENTS

| DE | 29 39 327 C2 | 4/1981 |
| DE | 199 07 732 B4 | 8/2000 |
| EP | 1 565 680 B1 | 8/2005 |

OTHER PUBLICATIONS

Translation of DE 2939327 A1; Mueller Peter, Larsen Soenke; Apr. 16, 1981.*
Bosch Rexroth AG: Data Sheet, "LUDV control block in sandwich plate design M7-25", RE 64297/07.2016, Lohr am Main.

* cited by examiner

*Primary Examiner* — Marina A Tietjen
*Assistant Examiner* — Paul J Gray
(74) *Attorney, Agent, or Firm* — Maginot, Moore & Beck LLP

(57) ABSTRACT

A valve includes a body defining first and second connection points, a valve slider, a spring, and a choke. The valve slider delimits first and second apertures to enable conduction of pressurized fluid from the first connection point to the second connection point via the first aperture, and is configured to move in an adjustment direction to close the first aperture. The choke is configured to enable conduction of pressurized fluid from the first connection point to the second connection point via the second aperture and via the choke. A first control point is defined between the choke and the second aperture. A second pressure at the first control point and a force of the spring pushes the valve slider in the adjustment direction, and a first pressure at the first connection point pushes the valve slider against the adjustment direction.

8 Claims, 3 Drawing Sheets

VALVE WITH FLOW CONTROL AND PRESSURE LIMITATION FUNCTION

This application claims priority under 35 U.S.C. § 119 to patent application no. DE 10 2015 222 745.6, filed on Nov. 18, 2015 in Germany, the disclosure of which is incorporated herein by reference in its entirety.

BACKGROUND

The disclosure concerns flow control valves and pressure-limiting valves. The datasheet "LUDV control block in sandwich plate design M7-25" by Bosch Rexroth AG (order number RE 64297, issue June 2012), discloses a hydraulic valve block. This has an LS line which can be connected to a separate flow control valve and to a separate pressure-limiting valve.

SUMMARY

One advantage of the valve according to the invention is that it can perform both the flow control function and the pressure limitation function, wherein it takes up particularly little space.

It is proposed that a first choke is provided such that pressurized fluid can be conducted from the first connection point via the first choke and the second aperture to the second connection point, wherein a first control point is arranged between the first choke and the second aperture, wherein the pressure at the first connection point pushes the valve slider against the adjustment direction, wherein the pressure at the first control point pushes the valve slider in the adjustment direction.

The first choke preferably has a fixed flow resistance. The first choke is preferably arranged upstream of the second aperture so that the pressurized fluid can be conducted from the first connection point via the first choke, onward via the first control point, onward via the second aperture to the second connection point. This gives a particularly compact valve. It is however also conceivable to arrange the first choke downstream of the second aperture.

It may be provided that the second aperture can be opened by movement of the valve slider in the adjustment direction. This gives a particularly compact valve which has the desired flow control and pressure limitation functions.

It may be provided that the valve slider has a first, a second and a third position through which the valve slider passes successively on movement against the adjustment direction, wherein in the first position only the second aperture is opened, wherein in the third position only the first aperture is opened. In this way, the flow control function of the valve is disabled when the pressure limitation function of the valve responds.

In may be provided that in the second position of the valve slider, the first and the second apertures are closed. This achieves that the flow control function can work independently of the pressure limitation function as long as the pressure limitation function does not respond. In particular, the flow control takes place between the first and second positions. When the pressure limitation function responds, the valve slider is in the third position.

A pilot pressure-limiting valve with an adjustable third aperture may be provided such that the pressurized fluid can be conducted from the first control point via the third aperture to the second connection point. The trigger pressure of the pressure limitation function may be influenced with the pilot pressure-limiting valve. The trigger pressure of the pilot pressure-limiting valve is preferably constantly adjustable so that the trigger pressure of the pressure limitation function of the valve is constantly adjustable. It should be noted that the pilot pressure-limiting valve may be designed substantially smaller than the pressure-limiting valve from the datasheet cited initially.

It may be provided that the third aperture is limited by a movable valve body on which the force of a second spring and/or the force of a rotor can act. The trigger pressure of the pilot pressure-limiting valve may thus be influenced both by the force of the second spring and also by the force of the rotor. The third aperture is preferably delimited by a valve seat. The valve seat may preferably be connected fluid-tightly to the valve body, most preferably with a valve cone on the valve body. The valve body is preferably movable linearly, parallel to the adjustment direction. The pretension of the second spring is preferably adjustable, most preferably by means of a setscrew. The pilot pressure-limiting valve may optionally have a falling or a rising curve, wherein both embodiments most preferably differ only by the arrangement of the rotor in the valve, in particular in the pole tube.

It may be provided that the valve body is pushed in the opening direction of the third aperture by the pressure at a second control point, wherein pressurized fluid can be conducted from the first control point via the second control point to the third aperture. Thus the pilot pressure-limiting valve opens depending on the pressure at the first control point.

A second choke may be provided such that pressurized fluid can be conducted from the first control point via the second choke to the second control point. This prevents system oscillations which could occur on response of the pressure limitation function. The second choke preferably has a fixed flow resistance. It is conceivable that the second choke is not present. Then the first and second control points coincide.

It may be provided that the first choke is arranged in the valve slider. This gives a particularly compact valve. The first choke is also particularly simple to produce.

It may be provided that the first connection point is arranged on the end face relative to the valve slider, wherein the second connection point is arranged radially relative to the valve slider. This gives a particularly compact valve, in particular in the case where the first choke is arranged upstream of the second aperture. In particular, the adjustment direction of the valve slider is decisive for the proposed arrangement of the first and second connection points.

It is evident that the features cited above and to be explained below may be used not only in the combination described but also in other combinations or alone without leaving the scope of the present disclosure.

BRIEF DESCRIPTION OF THE DRAWINGS

The invention is explained in more detail below with reference to the enclosed drawings. These show.

DETAILED DESCRIPTION

Figure 1:
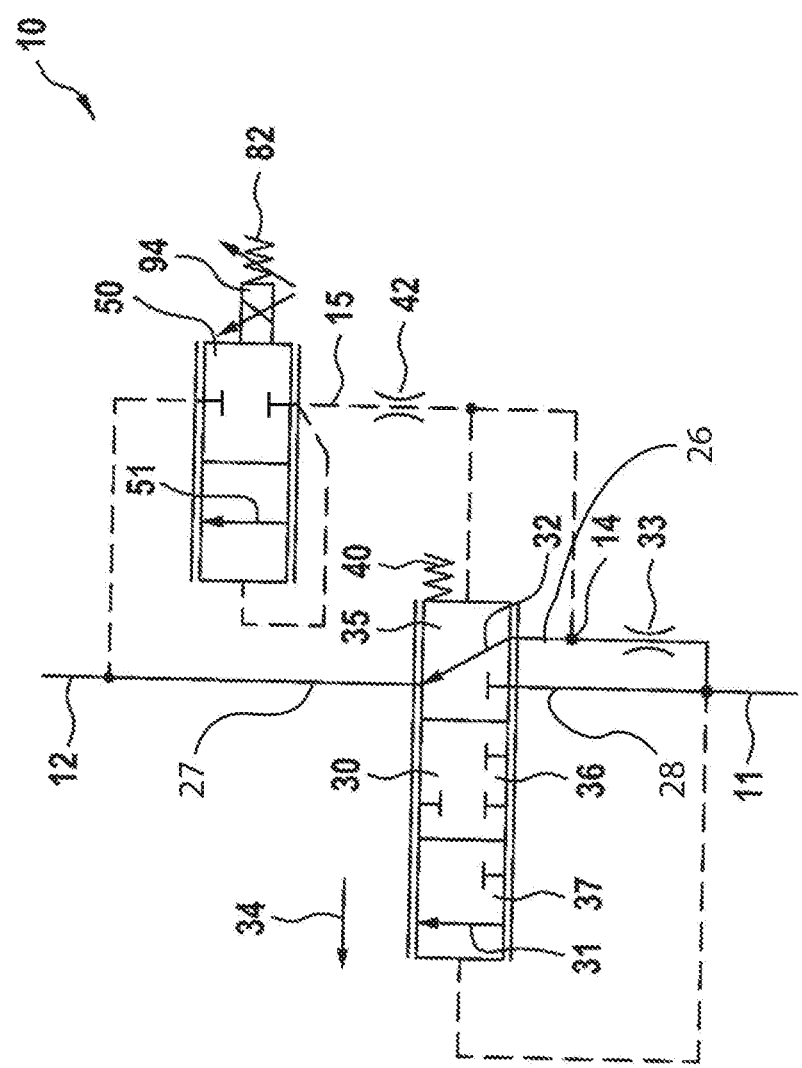
FIG. 1 a circuit diagram of the valve according to the disclosure.

FIG. 1 shows a circuit diagram of a valve 10 according to the disclosure. The valve 10 has a valve slider 30 which is movable relative to an adjustment direction 34. When the valve slider 30 moves against the adjustment direction 34, it passes successively through a first, a second and a third position 35; 36; 37. The valve slider 30 delimits a first and a second aperture 31; 32. In the first position 35, only the second aperture 32 is open and connects a first input 26 to an output 27. In the second position 36, the first and the second apertures 31; 32 are closed. In the third position 37, only the first aperture 31 is open, which connects a second input 28 to the output 27.

The valve 10 has a first and a second connection point 11; 12. The pressure to be influenced by the valve 10 is present at the first connection point 11. Typically, a tank is connected fluidically to the second connection point 12. Starting from the first connection point 11, pressurized fluid can be conducted via the first aperture 31 to the second connection point 12. In a parallel fluid flow path, pressurized fluid can be conducted starting from the first connection point 11 via a first choke 33, onward via the first control point 14, onward via the second aperture 32 to the second connection point 12.

The valve slider 30 is pushed by a first spring 40 in the adjustment direction 34, i.e. the closing direction of the first aperture 31. It is pushed further by the pressure at the first control point 14. The valve slider 30 is pushed by the pressure at the first connection point 11 against the adjustment direction 34, i.e. in the opening direction of the first aperture 31.

As long as the pressure at the first connection point 11 is sufficiently low, the valve slider 30 only moves between the first and the second positions 35; 36. It thus regulates the pressure drop at the first choke 33 to the pressure equivalent of the first spring 40, namely by adjusting the second aperture 32. Thus the volume flow over the first choke 33 is regulated. This may for example amount to 0.2 ltr/min. The second aperture 32 is preferably constantly adjustable. The first choke 33 preferably has a fixed flow resistance. The pretension of the first spring 40 may be fixedly predefined or adjustable. The pretension of the first spring 40 is preferably selected such that the pilot pressure-limiting valve 50 is opened before the valve slider 30, with the pilot pressure-limiting valve 50 closed, is pushed into the third position 37 purely by the pressure at the first connection point 11. It is however also conceivable that the pilot pressure-limiting valve 50 is omitted completely. The first aperture 31 would thus ensure an upward limitation of the pressure at the first connection point 11, wherein the trigger pressure depends substantially on the pretension of the first spring 40.

The trigger pressure of the pressure limitation function of the valve 10 can be adjusted by means of the pilot pressure-limiting valve 50. Said trigger pressure may for example lie between 5 and 420 bar. The pilot pressure-limiting valve 50 has a third aperture 51 configured as a seat valve which closes fluid-tightly. The pilot pressure-limiting valve 50 is pushed in the opening direction of the third aperture 51 by the pressure at the second control point 15. It is pushed in the closing direction of the third aperture 51 by a second spring 82, the pretension of which is preferably adjustable. The pretension force of the second spring 82 may also be overlaid by the force of an electromagnetic actuation 94. The magnetic actuation 94 may have a falling or a rising curve. EP 1 565 680 B1 for example discloses a pilot pressure-limiting valve with a falling curve which may be used in the context of the present disclosure. Here, the force of the electromagnetic actuation 94 acts in the opening direction of the third aperture 51. DE 199 07 732 B4 describes for example a pilot pressure-limiting valve with rising curve which may be used for the present disclosure. Here, the force of the electromagnetic actuation 94 acts in the closing direction of the third aperture 51.

In the present case, pressurized fluid can be conducted from the first control point 14 via a second choke 42, onward via the third aperture 51 to the second working connection point 12. The second choke 42 serves to damp system oscillations. It may also be omitted, so that the first and the second control point 14; 15 coincide. As long as the third aperture 51 is fully closed, the pressures at the first and the second control points 14; 15 are equal since no pressurized fluid flows away to the second connection point 12. The valve 10 then performs the flow control function described above. As soon as the pressure at the second control point 15 rises above the trigger pressure of the pilot pressure-limiting valve 50, the third aperture 51 opens. Thus pressurized fluid can flow with low resistance from the first control point 14 to the second connection point 12, whereby the pressure at the first control point 14 falls. The first and the second chokes 33; 42 ensure that the corresponding fluid flow is small, so that the adjustment forces on the pilot pressure-limiting valve 50 are low. Consequently, the pilot pressure-limiting valve 50 may be configured small.

Because of the pressure drop at the first control point 14, the force which pushes the valve slider 30 against the adjustment direction 34 and which is caused by the pressure at the first connection point 11, now prevails. This causes the valve slider 30 to move into the third position 37 in which the first aperture 31 is opened. The flow resistance of the fluid flow path, which leads from the first working connection point 11 via the first aperture 31 to the second working connection point 12, is preferably substantially smaller than the flow resistance of the parallel fluid flow path which leads from the first connection point 11 via the first choke 33, onward via the second choke 42, onward via the third aperture 51 to the second working connection point 12.

Figure 2:
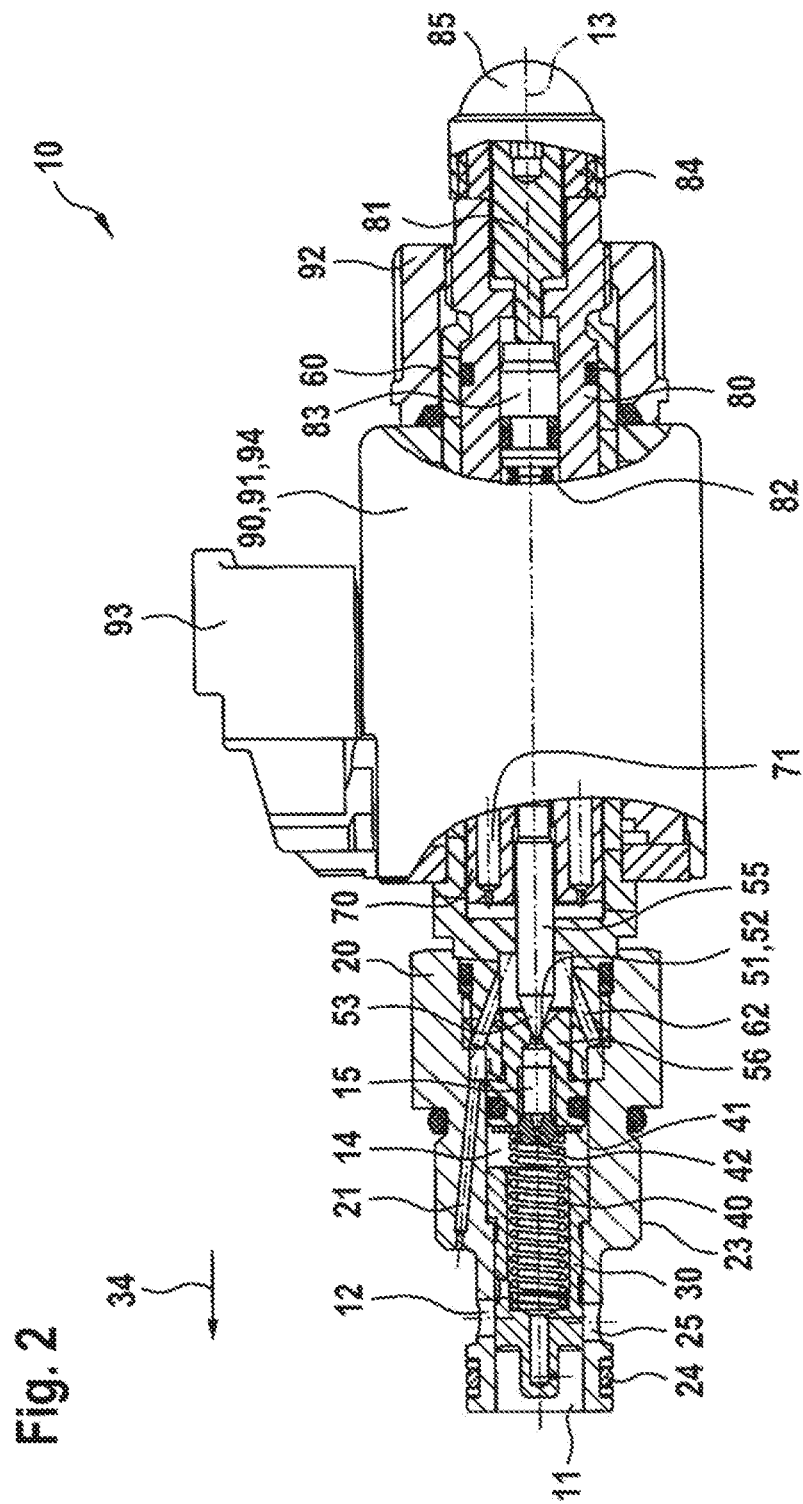
FIG. 2 a longitudinal section through a valve according to the disclosure.

FIG. 2 shows a longitudinal section through a valve 10 according to the disclosure. The valve 10 is configured as a cartridge valve which can be screwed into an adapted receiver bore (not shown) by means of an external thread 23 on the housing 20. The seal 24 separates the first and the second connection points 11; 12 from each other. The first connection point 11 is arranged on the end face of the housing 20, wherein the second connection point 12 is arranged radially on the housing 20. In the region of the second connection point 12, several bores 25 running radially relative to the longitudinal axis 13 are arranged in the housing 20. Inside the housing 20, a valve slider 30 is received which can move linearly parallel to the longitudinal axis 13. The adjustment direction 34 is here oriented parallel to the longitudinal axis 13 and to the left in FIG. 2. The valve slider 30 is pushed in the adjustment direction 34 by a first spring 40, in this case formed as a coil spring, wherein the corresponding movement travel is limited by a stop (22 in FIG. 3) on the housing 20.

In the present case, a separate insert 56 is received immovably in the housing 20 and separates the first control point 14 from the second control point 15. The first spring 40 is supported on the insert 56 via a separate spring plate 41. The second choke 42 is arranged in the spring plate 41, and via this the first control point 14 is fluidically connected to the second control point 15. The pressure at the first control point 14 pushes the valve slider 30 in the adjustment direction 34.

Furthermore, a valve seat 52 is provided on the insert 56 and can be closed fluid-tightly by a valve cone 53 on a valve body 55. The valve seat 52 together with the valve cone 53 forms the third aperture 51. The pressure at the second control point 15 pushes the valve body 55, in particular its valve cone 53, in the opening direction of the third aperture 51.

The pole tube 60 is screwed into the housing 20, wherein the insert 56 protrudes in portions into the pole tube 60. A second channel 62 is arranged in the pole tube 60 and is extended by a first channel 21 such that the second connection point 12 is fluidically connected to the third aperture 51.

Furthermore, the pole tube 60 receives a valve member 70 (also referred to herein as a rotor) which can move parallel to the longitudinal axis 13. The needle-like valve body 55 is supported on the valve member 70. On the opposite side, the valve member 70 is pressurized by a second spring 82, the pretension of which can be adjusted by the movable adjustment piston 83 and the setscrew 81. The setting of the setscrew 81 can be secured with the lock nut 84. The setscrew 81 and the lock nut 84 are provided with a removable cover cap 85 to protect them from environmental influences.

The pole tube 60 largely consists of a ferromagnetic material, wherein a flux interruption portion is provided in the region of the valve member 70 and formed for example from a non-magnetic material. A coil 90 is arranged around the pole tube 60, with which an electromagnetic force can be exerted on the valve member 70 and hence on the valve body 55. This force may be directed, depending on the desired curve, either to the left or to the right in FIG. 2. The pole tube 60 is closed at one end with a separate bush 80 which is pressed into the pole tube 60. Preferably, depending on the desired curve, a second bush 80 is used so that the position of the valve member 70 relative to the coil 90 can be selected differently. The coil 90 is surrounded by a ferromagnetic coil housing 91 which causes the back-connection of the magnetic field lines so that when the current in the coil 90 is low, the magnetic force on the valve member 70 is high. The coil 90 is provided with a connection bush 93 via which electrical current can be fed into the coil 90. The coil 90 together with the coil housing 91 is fixed by means of a separate retaining nut 92 on the pole tube 60. At least one channel 71 running parallel to the longitudinal axis 13 passes through the valve member 70 so that on movement of the valve member 70, pressurized fluid can flow through this. The pressurized fluid is preferably a liquid, most preferably hydraulic oil.

Figure 3:
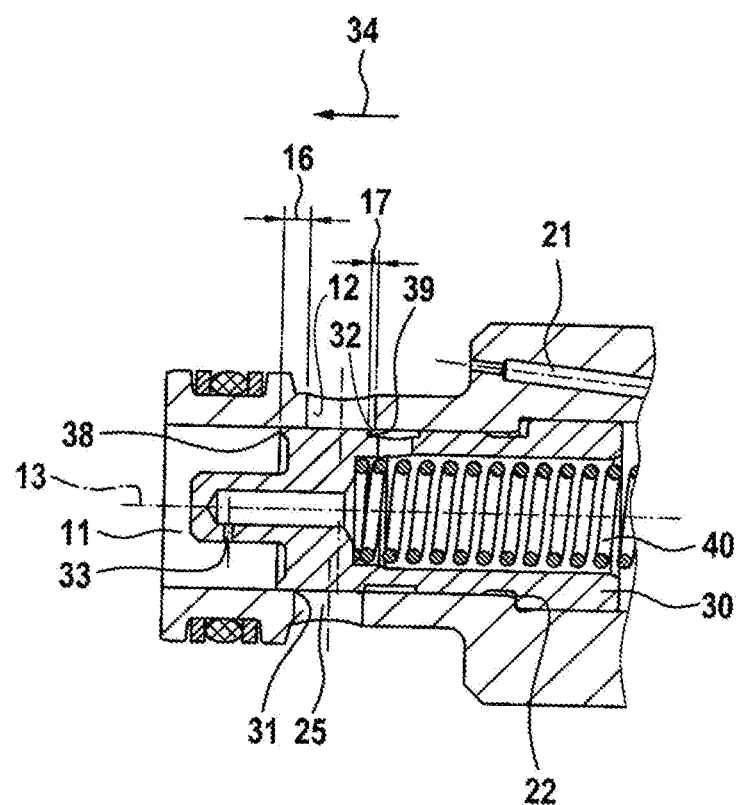
FIG. 3 an enlarged extract of FIG. 2 in the region of the valve slider.

FIG. 3 shows an enlarged extract of FIG. 2 in the region of the valve slider 30. The valve slider 30 is shown in the first position (35 in FIG. 1) in which it is pressed by the first spring 40 against the stop 22 on the housing 20. Several bores 25 running radially relative to the longitudinal axis 13 are arranged in the housing 20, and connect the second working connection point 12 to the valve slider 30. These are part of both the first and the second aperture 31; 32. A first and a second control edge 38; 39 are provided on the valve slider 30 which run as a circle around the longitudinal axis 13, pointing in opposite directions. In the first position, the second control edge 39 covers the radial bores 25 so that the second aperture 32 is opened. The first control edge 38 is however arranged next to the radial bores 25 such that the first aperture 31 is closed. When the valve slider is moved to the right in FIG. 3, first the second aperture 32 closes so that the second position (36 in FIG. 1) of the valve slider 30 is reached. When the valve slider 30 is moved further to the right in FIG. 3, the first aperture 31 opens so that the third position (37 in FIG. 1) of the valve slider 30 is reached.

The first distance 16 between the first control edge 38 and the radial bores 25, in the first position of the valve slider 30, is greater than the second distance 17 between the second control edge 39 and the radial bores 25. Then the first and the second apertures 31; 32 are closed in the second position. The pressure at the first connection point 11 pushes the valve slider 30 against the valve direction 34, i.e. to the right in FIG. 3.

The first choke 33 is formed by a thin bore in the valve slider 30 which connects the first working connection point 11 to the first control point 14. Said bore runs radially to the longitudinal axis 13. The second control edge 39 is fluidically connected to the first connection point 14 via at least one radial bore 25 in the valve slider 30.

REFERENCE NUMERALS

10 Valve
11 First connection point
12 Second connection point
13 Longitudinal axis
14 First control point
15 Second control point
16 First distance
17 Second distance
20 Housing
21 First channel
22 End stop
23 External thread
24 Seal
25 Radial bore
30 Valve slider
31 First aperture
32 Second aperture
33 First choke
34 Adjustment direction
35 First position of valve slider
36 Second position of valve slider
37 Third position of valve slider
38 First control edge
39 Second control edge
40 First spring
41 Spring plate
42 Second choke
50 Pilot pressure-limiting valve
51 Third aperture
52 Valve seat
53 Valve cone
55 Valve body
56 Insert
60 Pole tube
62 Second channel
70 Rotor
71 Channel in rotor
80 Bush
81 Setscrew
82 Second spring
83 Adjustment piston
84 Lock nut
85 Cover cap
90 Coil
91 Coil housing
92 Retaining nut
93 Connection bush
94 Electromagnetic actuation

What is claimed is:
1. A valve comprising:
a first input;
a second input;
only one output;

a housing having a first connection point connected to the first input and the second input and a second connection point connected to the only one output;

a valve slider that delimits a first aperture and a second aperture, the valve slider configured to control conduction of a pressurized fluid from the first connection point to the second connection point, and the valve slider further configured to move in an adjustment direction that causes the valve slider to close the first aperture and to open the second aperture;

a first spring configured to exert a first spring force that pushes the valve slider in the adjustment direction; and a first choke configured to enable conduction of the pressurized fluid from the first connection point to the second connection point via the first choke and the second aperture, wherein a first control point is defined between the first choke and the second aperture, wherein a first pressure of the pressurized fluid located at the first connection point moves the valve slider in a direction opposite of the adjustment direction, wherein a second pressure of the pressurized fluid located at the first control point moves the valve slider in the adjustment direction, and wherein the valve slider is a three position slider configured to move to (i) a first position in which only the second aperture is open and only the second input is connected to the only one output, (ii) a second position in which the first aperture and the second aperture are closed and disconnected from the only one output, and (iii) a third position in which only the first aperture is open and only the first input is connected to the only one output.

2. The valve according to claim 1, wherein motion of the valve slider in the adjustment direction causes the second aperture to open.

3. The valve according to claim 1, wherein in the second position, the valve slider is disposed along the adjustment direction between the first position and the third position such that the first aperture and the second aperture are closed.

4. The valve according to claim 1, further comprising:
a pilot pressure-limiting valve that defines a third aperture configured to enable conduction of the pressurized fluid from the first control point to the second connection point.

5. The valve according to claim 4, wherein a pressure of the pressurized fluid located at a second control point moves a valve body of the pilot pressure-limiting valve in an opening direction of the third aperture to enable the conduction of the pressurized fluid from the first control point to the third aperture via the second control point.

6. The valve according to claim 5, further comprising a second choke configured to enable conduction of the pressurized fluid from the first control point to the second control point via the second choke.

7. The valve according to claim 1, wherein the first choke is positioned in the valve slider.

8. A valve comprising:
a first input;
a second input;
only one output;
a housing having a first connection point and a second connection point;
a valve slider that delimits a first aperture and a second aperture, the valve slider configured to control conduction of a pressurized fluid from the first connection point to the second connection point, and the valve slider further configured to move in an adjustment direction that causes the valve slider to close the first aperture and to open the second aperture;
a first spring configured to exert a first spring force that pushes the valve slider in the adjustment direction; and
a first choke configured to enable conduction of the pressurized fluid from the first connection point to the second connection point via the first choke and the second aperture,
wherein a first control point is defined between the first choke and the second aperture,
wherein a first pressure of the pressurized fluid located at the first connection point moves the valve slider in a direction opposite of the adjustment direction,
wherein a second pressure of the pressurized fluid located at the first control point moves the valve slider in the adjustment direction,
wherein the first connection point is located on an end face of the housing relative to the valve slider,
wherein the second connection point is located on the housing radially relative to the valve slider, and
wherein the valve slider is positionable in (i) a first position in which only the second aperture is open and only the second input is connected to the only one output, (ii) a second position in which the first aperture and the second aperture are closed and disconnected from the only one output, and (iii) a third position in which only the first aperture is open and only the first input is connected to the only one output.

* * * * *